July 23, 1957 W. NOER 2,799,963
FISHING LURE
Filed Sept. 22, 1955
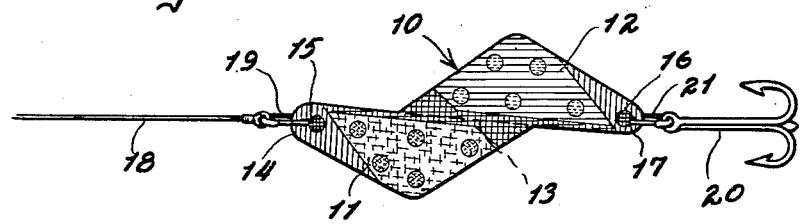
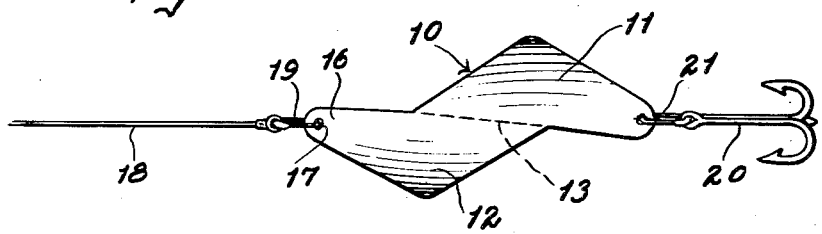
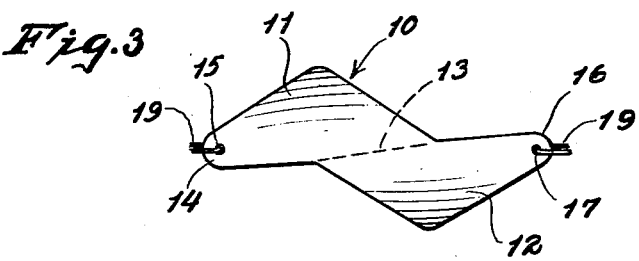
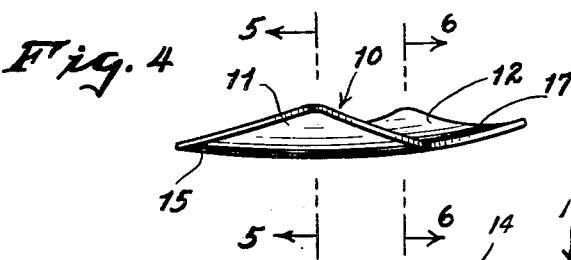
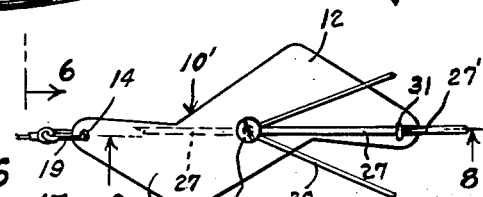
INVENTOR.
WILLIAM NOER
BY
L. S. Saulsbury
ATTORNEY

United States Patent Office 2,799,963
Patented July 23, 1957

2,799,963

FISHING LURE

William Noer, San Diego, Calif.

Application September 22, 1955, Serial No. 535,795

9 Claims. (Cl. 43—42.5)

The invention relates to fishing lures.

It is an object of the present invention to provide a fishing lure having a built-in double action.

It is another object of the present invention to provide a fishing lure of the above type which includes two working sides that are opposite to each other and which, when retrieved, will wiggle and wobble in a realistic manner and which will attract the fish by simulating the appearance of a small fish or minnow.

Other objects of the invention are to provide a fishing lure having the above objects in mind which is of simple construction, has a minimum number of parts, is easy to use and efficient in operation.

For other objects and a better understanding of the invention, reference may be had to the following detailed description taken in connection with the accompanying drawing, in which:

Figure 1 is a top plan view of a preferred embodiment of the present invention shown in operative use and bearing indicia simulating a fish;

Fig. 2 is a top plan view similar to Fig. 1 but showing the lure reversed with respect to the leader and hook and without indicia;

Fig. 3 is a bottom plan view of the invention;

Fig. 4 is a side elevational view thereof;

Fig. 5 is a sectional view taken along the line 5—5 of Fig. 4; and

Fig. 6 is a sectional view taken along the line 6—6 of Fig. 4;

Fig. 7 is a top plan view of a modified form of the invention wherein the hook and weed guard is connected to the top of the lure in a close coupled relationship therewith;

Fig. 8 is a longitudinal sectional view taken on line 8—8 of Fig. 7.

Referring now more in detail to the drawing, 10 indicates generally a fishing lure embodying the features of the present invention formed of brass, copper or other suitable plate metal and including the symmetrical, oppositely disposed triangular portions 11 and 12 which are integral with each other along the imaginary center line 13 (Fig. 2), substantially as illustrated.

As shown in Figs. 1 through 3, each of the side portions 11 and 12 has the general configuration of an isosceles triangular figure, each of the triangles being joined integrally to the other along substantially one-half of the base lines thereof. It will also be noted that the apex of each of the triangular side portions is an obtuse angle, while the base angles are acute.

The endmost base angle of the triangular side portion 11 is rounded as at 14 and is provided with an opening 15 while one of the base angles of the triangular side portion 12 is similarly rounded as at 16, and provided with an opening 17 therethrough.

As shown in Figs. 5 and 6, each of the side portions 11 and 12 is of arcuate cross section in a lateral direction. However, in the further practice of my invention, the curvature of the side 11 is greater than that of the side portion 12 for a purpose which will hereinafter become clear. The leader 18 may be connected to either of the ends of the lure by means of the snap-on element 19.

A treble hook 20 may be connected to either end of the lure by means of the split ring 21.

Each of the side portions 11, 12 may be provided with suitable designs or patterns simulating the appearance of small fish or minnows, preferably the designs being different from each other. This permits the appearance of two different lures with a unitary device. The lure may be plated with silver, nickel, chrome or other material or may remain uncoated.

In operation, when retrieved the lure 10 will wiggle and wobble with the side portions 11 and 12, simulating the appearance of a small fish or minnow in a natural manner.

By means of the openings 15 and 17 and the snap element 19 and split ring 21, the position of the lure with respect to the leader and hook may be easily and readily reversed. Due to the difference in curvature of the side portions 11 and 12, this has the effect of providing a double action in a unitary lure. For example, when arranged as shown in Fig. 1, the wobbling movement of the lure will be relatively rapid while when the lure is reversed to the position of Fig. 2, the wobbling action will be relatively slower. This difference in wobbling action is due to the difference in curvature of the side portions 11 and 12 (Figs. 5 and 6). Thus, the wobbling action of the lure may be adjusted to the speed at which the fish are striking the bait or hook, as the occasion requires. This represents an advantage over conventional lures which incorporate a single working part. The present invention contemplates a double action lure, which is an advantage over the prior art in this respect.

Referring now particularly to Figs. 7 and 8, the fishing lure 10' has a threaded hole 26 provided along its central line 13 intermediate the length thereof. This hole permits the attachment to the lure of a single hook 27 and a hairpin-like guard 29 having its ends projecting upwardly and respectively at opposite sides of the pointed end 27', of the hook. A fastening screw 30 passes through the guard 29 and eye 27" of the hook 27 and into the threaded opening hole 26 to secure the guard and hook to the center point of the lure. A cotter-like eye pin 31 is fitted over the hook 27 adjacent to the pointed end 27' and extending through hole 17 in the trailing end of the lure and the ends thereof peened over as indicated at 31' so as to further secure the hook 27 to the lure. It will be understood that the hook and the guard can be extended toward the opposite end of the lure as indicated with dotted lines and the leader snap element 19 fastened to the opposite end of the lure through hole 17 instead of through hole 14 as shown in Fig. 7. It will be understood that the lure will wobble in the same manner and pull through the water as described above and the pointed end of the hook protected from the weeds by the guard 29.

It should now be apparent that there has been provided a fishing lure which imparts a double action and which represents an improvement over this type of lure.

While various changes may be made in the detail construction, it shall be understood that such changes shall be within the spirit and scope of the present invention as defined by the appended claims.

What is claimed is:

1. A fish lure comprising a pair of symmetrical, substantially triangular side portions integrally joined along substantially one-half the length of their base portions in a substantially Z-shaped configuration, and releasable means attached to each free end of each of the joined triangular side portions, each means being adapted to be attached to a hook and a leader, whereby to permit the reversal of the lure, each of said side portions being of arcuate cross section in a lateral direction, the curvature of one of said side portions being greater than the curvature of the other of said side portions whereby to permit either a fast wobbling motion or a slower wobbling motion as desired.

2. A fishing lure according to claim 1, each of said side portions having the general configuration of a substantially isosceles triangle having an obtuse apex and acute base angles, said side portions being integral with each other along substantially one-half the length of the base of the isosceles triangle.

3. A fishing lure according to claim 2, said releasable means for connecting the ends of said lure to a leader and a fish hook having openings at the opposite ends of said triangular side portions, a split ring threaded through one of said openings and connected to the fish hook, and a snap element threaded through the other of said openings and connected to the leader, said split ring and snap element being interchangeable.

4. A fish lure according to claim 3, the ends of said triangle side portions having said openings being rounded, the apex of said triangular side portions being similarly rounded.

5. A fish lure according to claim 4, each of said side portions carrying indicia simulating the appearance of a fish, said indicia on the respective side portions being distinctively different from each other.

6. A fish lure according to claim 1, and a single fish hook connected to the lure at the center thereof and at one end thereof and its pointed end extending upwardly from the top of the lure.

7. A fish lure as defined in claim 6, and a hairpin-like weed guard secured to the joined side portions by its apex end and having its leg ends respectively extending upwardly and along the opposite sides of the pointed ends of the hook.

8. A fish lure as defined in claim 6, and said hook and weed guard being adapted to be extended to the opposite end of the lure, and releasable means securing said hook and said guard to said lure to permit the adjustment thereof to the opposite end and for securing the same thereto.

9. A fish lure comprising a pair of symmetrical, substantially triangular side portions integrally joined along substantially one-half the length of their base portions in a substantially Z-shaped configuration, each of said side portions being of arcuate cross section in a lateral direction, the curvature of one of said side portions being greater than the curvature of the other of said side portions whereby to permit either a fast wobbling motion or a slow wobbling motion as desired, each of said side portions having the general configuration of a substantially isosceles triangle having an obtuse apex and acute base angles, said side portions being integral with each other along substantially one-half the length of the base of the isosceles triangle.

References Cited in the file of this patent
UNITED STATES PATENTS

| | | |
|---|---|---|
| 1,770,003 | Miller | July 8, 1930 |
| 2,001,055 | DeWitt | May 14, 1935 |
| 2,736,982 | Curtice | Mar. 6, 1956 |